Dec. 29, 1925.
E. KÜHN, JR
1,567,739
APPARATUS FOR MAKING ARTIFICIAL HARTSHORN SCALES FOR POCKETKNIVES
Filed Dec. 30, 1924
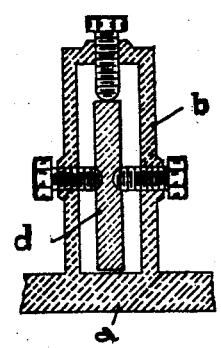
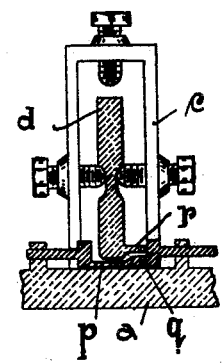
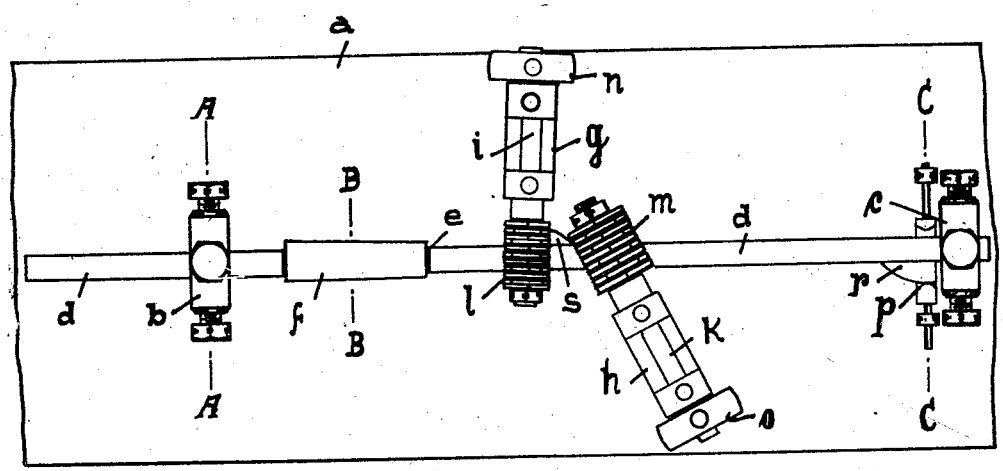
Witnesses:
Inventor:
Ernst Kühn jr Patented Dec. 29, 1925.

1,567,739

UNITED STATES PATENT OFFICE.

ERNST KÜHN, JR., OF SOLINGEN, GERMANY, ASSIGNOR TO THE FIRM OF: ANTON BENZ, OF SOLINGEN, GERMANY.

APPARATUS FOR MAKING ARTIFICIAL HARTSHORN SCALES FOR POCKETKNIVES.

Application filed December 30, 1924. Serial No. 758,949.

*To all whom it may concern:*

Be it known that I, ERNST KÜHN, Jr., a German citizen, and residing at Solingen, Germany, have invented certain new and useful Improvements in an Apparatus for Making Artificial Hartshorn Scales for Pocketknives (for which I have made application for patent in Germany on 12th April, 1924, No. B. 113667 XII/39a), of which the following is a specification.

This invention relates to an improved apparatus for making artificial hartshorn scales of bone for hilts of pocketknives or the like, in which the scale to be worked is reciprocated on a slide beneath rotary cutters for providing therein the hartshornlike depressions. The novelty consists in that the rotary cutters are arranged obliquely to the longitudinal direction of the work-piece and that the slide carrying the latter is at its return movement led over a raised plane of a support that is adjustable by lateral wedgelike projections on said slide. Thereby, the cutters provide not only at the forward movement but also at the return movement of the slide hartshornlike depressions in the scale.

The accompanying drawing illustrates the improved apparatus: Fig. 1 is a plan view of the same, while Figs. 2, 3 and 4 are cross-sections respectively on the lines A—A, B—B and C—C of Fig. 1.

In fixed guides $b$, $c$ of a table $a$ a slide $d$ is movably arranged, the scale of bone $f$ to be worked lying in a depression $e$ of said slide. Two bearings $g$, $h$ on said table support axles $i$, $k$ respectively carrying at their front ends rotary cutters $l$, $m$ and at their rear ends driving pulleys $n$, $o$ respectively. Said bearings are so arranged that the cutters are located obliquely to the longitudinal direction of the scale $f$ to be worked. The right-hand end of the slide $d$ (Fig. 1) bears upon a laterally movable support $p$ beside the fixed guide $c$, said support having a raised plane $q$ (Fig. 4), while both lateral faces of the slide $d$ are fitted with wedgelike projections $r$, $s$ controlling the position of said support $p$. By moving the slide forward to the right (Fig. 1), the scale $f$ is provided by the cutters $l$, $m$ with hartshornlike depressions. Upon the scale $f$ lying then behind the cutters (at the right-hand side thereof, Fig. 1), the wedgelike projection $s$ on the slide moves the support $p$ in rearward direction whereby the raised plane $q$ lifts the slide, which is then moved rearward to the left and, owing to its now raised position, again offers the scale $f$ thereon the action of the cutters $l$, $m$.

What I claim, is:

In an apparatus for making artificial hartshorn scales of bone for hilts of pocketknives or the like: the combination of a reciprocating slide for the reception of the scale to be worked, rotary cutters arranged above said slide and obliquely to the longitudinal direction of the same, fixed guides for said slide, a laterally movable support for said slide beside one of said guides, a raised plane on said support, and wedgelike lateral projections fitted to both lateral faces of said slide and adapted to eventually move said support in lateral directions whereby said slide is made to bear either upon the support or upon the raised plane of the latter respectively, substantially as and for the purpose set forth.

In testimony whereof I have hereunto set my hand.

ERNST KÜHN, JR.